Figure 1:
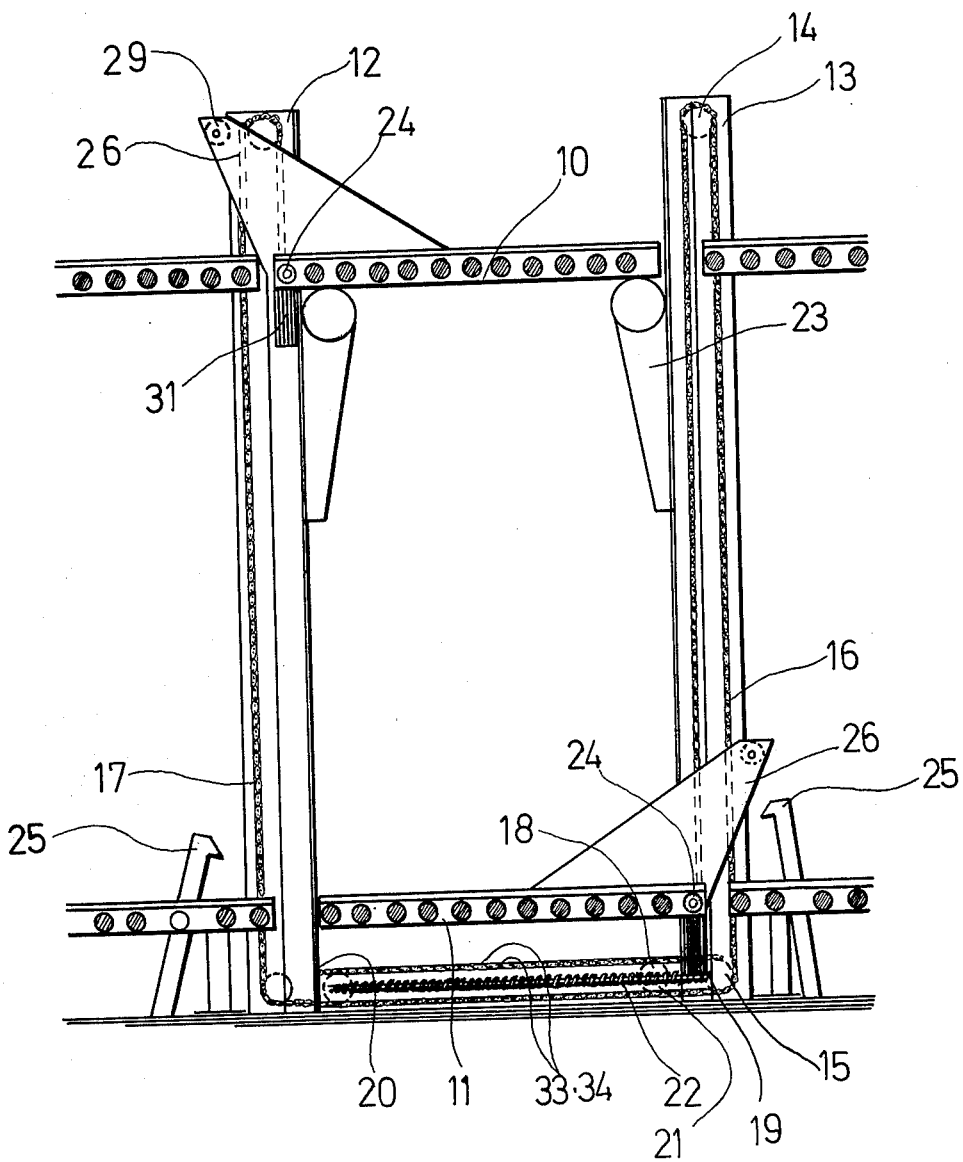

United States Patent [19]

Anderson

[11] 4,084,660
[45] Apr. 18, 1978

[54] LIFTING DEVICE FOR MOVING GOODS BETWEEN DIFFERENT LEVELS

[76] Inventor: Leif Per Roland Anderson, Bogatan 39 A, S- 412 72 Goteborg, Sweden

[21] Appl. No.: 765,644

[22] Filed: Feb. 4, 1977

[51] Int. Cl.² .............................................. B66B 11/04
[52] U.S. Cl. .................................................... 187/26
[58] Field of Search .................... 187/1 R, 2, 3, 4, 5, 187/16, 17, 26, 8.59, 24; 198/487, 570, 574, 776; 214/16.1 E, 16.1 EA, 16.1 EB, 16.1 EC

[56] References Cited

U.S. PATENT DOCUMENTS

| 1,748,438 | 2/1930 | Bernstein | 187/1 R |
| 1,884,641 | 10/1932 | Fitch | 187/26 |

FOREIGN PATENT DOCUMENTS

| 1,348,399 | 12/1964 | France | 187/1 R |
| 647,666 | 10/1962 | Italy | 187/1 R |

Primary Examiner—Evon C. Blunk
Assistant Examiner—James L. Rowland

[57] ABSTRACT

A lifting device for moving two goods carrying platforms between different levels. The platforms are provided to perform a synchronous displacing movement in opposite directions relative to each other in one single path of travel. For the movement of the platforms transmission means are provided including two elongated flexible traction elements, preferably two chains. The one end of each element is fixed by anchoring to a stationary part of the lifting device and the other end is fixed to one of the platforms. A number of pulleys are provided to perform a linear reciprocating movement by means of driving means and thereby bring about a longitudinal change of a loop provided for each one of the traction elements and stretching around the respective pulley in opposite directions so that the loop which is connected with one of the platforms is lengthened, at the same time as the loop which is connected with the other platform is shortened and vice versa. Further means is provided to move aside the platform which is moving in the return direction in order to provide free passage for the platform, which is moving in the intended direction of goods transfer, which means comprises pivoting means for the platforms.

1 Claim, 3 Drawing Figures

LIFTING DEVICE FOR MOVING GOODS BETWEEN DIFFERENT LEVELS

In places where goods are stored in and taken out of compartments located at several different levels, for instance in warehouses, lifting devices in several units have to be provided. Such a lifting device can be arranged at each vertical row of compartments, but can also be of mobile type. However, as a rule the lifting device is installed at certain junctions for horizontal conveyors. In such installations in warehouses usually comprising a number of units, it is necessary that the lifting device shall not require too much space, neither with respect to its height nor to its lateral dimensions. In this connection it is essential that the lifting device has a high capacity relative to the required space as well as to its costs.

It is an object of the present invention to provide a lifting device, which fullfils the abovementioned requirements.

A further object is to provide a lifting device with a lifting machinery occupying a minimum of space.

Said objects are reached by means of a power transmission including means, which gears up the driving motion created by the driving means so that the driving machinery can be designed with smaller dimensions. It is another essential principle of the power transmission means that it is designed in such a manner that its parts substantially are subjected to tension forces, whereby for a predetermined lifting capacity they can be given the smallest possible dimensions. As a consequence hereof also the cost of its manufacture can be kept down.

Figure 2:
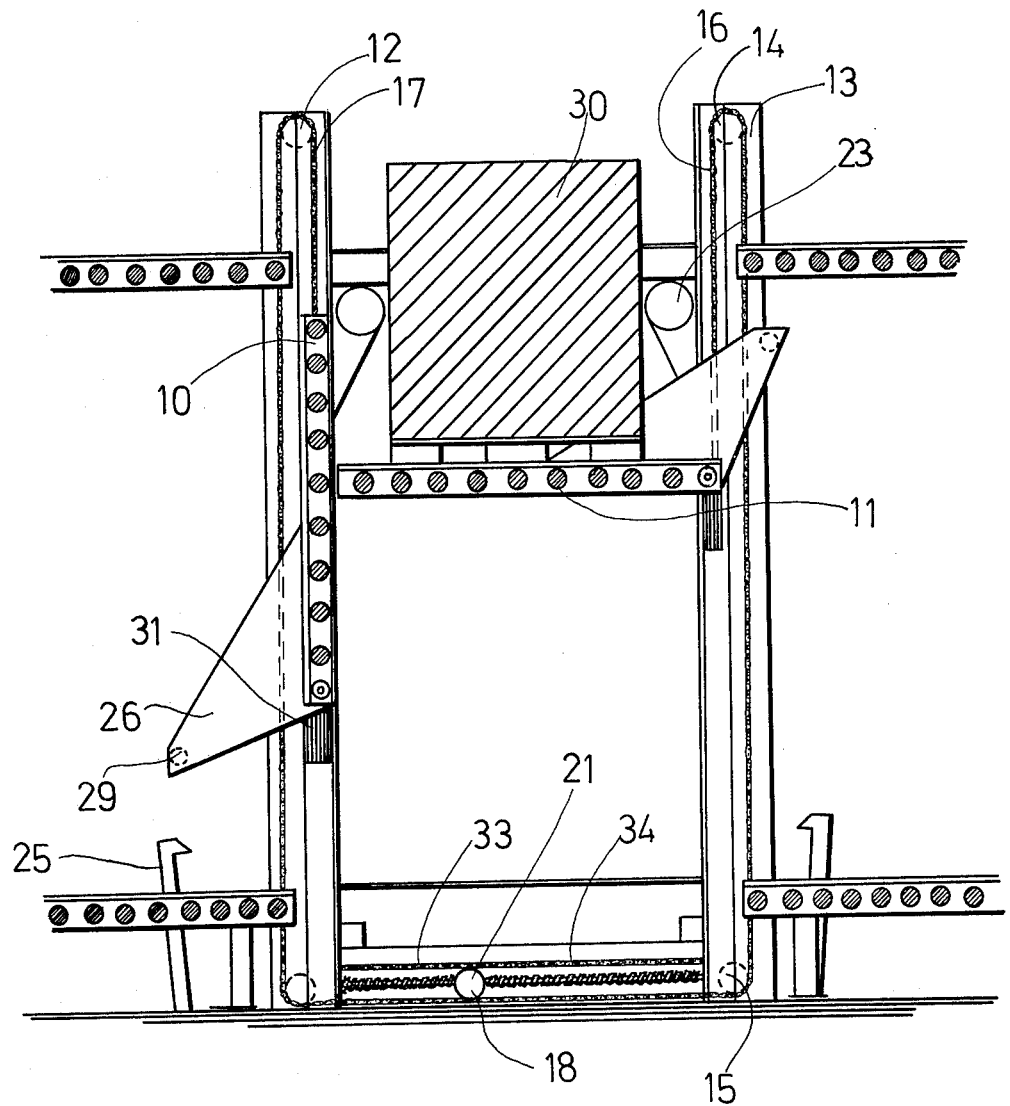
Figure 3:
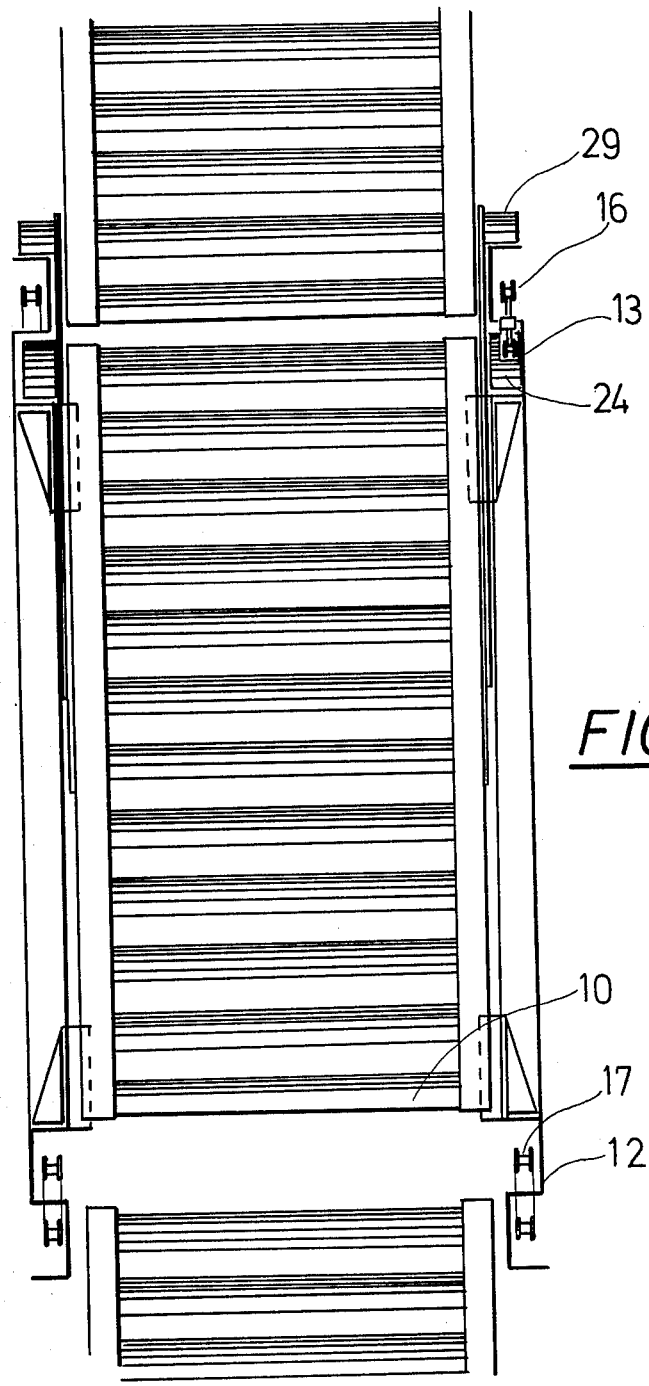

The invention will now be described more in detail in the following description of an embodiment of the same, reference being made to the accompanying drawings, in which FIG. 1 is a schematical side elevational view of the lifting means, which comprises two platforms for goods illustrated in their end positions;

FIG. 2 is a view substantially corresponding to the one in FIG. 1, but with the platforms illustrated while they are moved, and FIG. 3 is a view of the lifting means as seen from above.

In the embodiment illustrated in FIGS. 1 - 3 the lifting means according to the invention comprises two platforms 10 and 11, which are intended to be loaded with goods and be moved between different levels. The movement of the platforms 10, 11 is provided by means of driving means, which in the example illustrated comprises an electric motor geared down to low speed (not shown) and a screw 22 driven by this motor, and further power transmission means, which is connected both with the driving means and with the platforms.

The two platforms 10 and 11 are arranged to travel along the same path of movement and are guided each one by a double guide 12, 13. In order to utilize the same driving means and partly also the same power transmission means for both platforms 10, 11, which are arranged to move synchronously with each other but in opposite directions, parts of the power transmission means are placed in horizontal position in a location below the lower end position of the platforms. In order to make this possible, the double guides 12 and 13 are provided with upper pulleys 14 and lower pulleys 15, and the latter ones are substantially located at the same level as the horizontally positioned parts of the power transmission means, which substantially comprise a screw 22 extending in horizontal direction and a pulley unit 21 provided with a nut cooperating with the screw 22, said pulley unit 21 having pulleys 18. A parallel pair of transmission elements 17 of chain, rope or similar type are at one end connected with one of the platforms 10, while the other transmission elements 16 at their corresponding end are connected with the other of the platforms 11. The opposite ends of the transmission elements 16, 17 are pairwise anchored to the guides 12 and 13 respectively at the anchoring points 19 and 20 respectively. By this arrangement the transmission elements form loops 33, 34 in opposite directions round the pulley unit 21, which will give the platforms 10, 11 synchronous movements in opposite directions, which will be explained below.

In order to permit the two platforms 10, 11 to pass each other in the path of transportation which as mentioned before is common for the platforms, the platforms 10 are adapted to be folded upwards during movement in one direction of transportation, or more exactly the direction, which constitutes the return direction when the platform is empty. This is brought about by making the platform pivotable around a pivoting axis, which is formed by two traversing wheels 24 guided in their respective pair of guides 12, 13. The platforms 10, 11 are horizontally supported by said traversing wheels 24 in cooperation with the guides and with two traversing wheels 29, which bear against the outside of the guides and are connected with each respective platform by means of a lever arm 26. Into the path of travel of the platforms 10, 11 two spring biased pivoting means 23 project, which are arranged during the downwards movement of the platforms to be in an extended position to pivot the platforms upwards, but during the upwards movement to be swung inwards in line with the guides thereby not influencing the platforms. The lifting means further comprises a hydraulic catching device 25, which is provided to catch the lever arm 26 of the respective platform and slowly lower down this to horizontal position. A counterweight provided near to the pivoting axis of the platforms is indicated at 31.

During the transportation of goods between different levels by means of the lifting device the following takes place. When the driving motor is started and the screw 22 is brought into rotation, the pulley unit 21 is displaced in one direction or the other depending upon the direction of rotation of the motor.

With the extension of the loops 33, 34 formed by the elements of transmission 16, 17 around the pulley unit 21, as has been described above, a lengthening of the loop 34 of the transmission elements 16 is obtained during its displacement along the screw 22 by way of example from right to left in FIG. 1, at the same time as the loop 33 of the transmission elements 17 is shortened. This results in that the platform 11, which in FIG. 1 is shown in the low end position, is moved upwards while the platform 10, which is at the upper end position, is moved downwards.

As is evident from FIG. 2 the following takes place when the two platforms 10, 11 pass each other. The platform 10, which moves from the upper end position in a downwardly direction is brought into contact with the pivoting means 23, which is spring biased to be in the path of travel of the platforms, and forced to pivot around its pivoting axis formed by the traversing wheels 24 to a folded-up position. The platform 11, which moves from the lower end position in a direction upwards has a free passage past the completely folded-up platform 10. The pivoting means 23 are designed to be forced towards the guide when the platform passes in an upwardly direction by means of contact with the platform so that the platform will be free to pass with its wheels 24, 29 on opposite sides of the guide and will not be influenced. The catching means 25 is designed, when in the position shown in FIG. 2, to engage the lever arm 26 and at lowering of the platform to cause the same to be pivoted to its horizontal position. During the upwards movement of the platform the catching means 25 is disengaged from the lever arm 26, whereby the platform after loading with goods 30 again can be moved upwards by reversal of the direction of rotation of the screw 22, at the same time as the other platform is moved downwards in the manner described above.

However, it may be desirable to move goods downwards by means of the embodiment of the lifting device equipped with two platforms 10, 11. For this purpose the catching means 25 can be swung inwards to the position shown in FIG. 1 and hooked on the lever arm 26, when the platform is in its low position. When subsequently the platform moves upwards, the platform due to the pull of the catching means 25 on the lever arm 26 will be raised and will thus be moved upwards in folded-up position. The catching means are adapted to be loosened from the lever arm 26 when the platform has reached its folded-up position. For this purpose the end hook of the catching means is spring biased to resist a predetermined force which is exceeded when the platform is pivoted to its folded-up position. The hook will momentarily swing upwards so that the lever arm 26 can pass the same. When the catching means 25 is controlled to work in this manner the pivoting means 23 will at the same time be inactivated by being moved outside of the travelling path of the platforms, so that any pivoting of the downwards moving platform will not take place. The platform can consequently be loaded in the upper end position and be brought downwards, while the platform which is in its low position is pivoted and brought upwards passing the loaded platform in vertical position in order subsequently to be folded down in the upper position. The last mentioned folding down movement is actuated by means of a stop dog (not shown) which tilts the platform when it has reached a sufficiently high level, so that it falls down by its own weight. However, it may be necessary to damp this movement, which can be accomplished by way of example by means of a hydraulic damping cylinder. It can also be imagined that the pivoting means 23 can be utilized for this purpose if they are controlled to be folded out, when the platform approaches the upper end position, so that it is slowly folded down resting against the locking means 23 while its supporting carriage simultaneously is moving upwards. Said control of the pivoting means 23 and the catching means 25 is suitably performed by means of hydraulic or pneumatic cylinder means in a system, which is designed in such a manner that the goods cannot be loaded onto a platform which is set to be pivoted or in such a way that other faults can appear, could result in a collision of the platform or tipping of any loaded goods.

I claim:

1. Lifting device for the transfer of goods from a first level to a second level, comprising driving means, a frame having two guides, two platforms movable along said guides, pivoting means for supporting each platform on a respective guide and permitting each platform to be pivoted between a first position extending from its respective guide wherein it can carry goods and a second position adjacent to its respective guide, said guides being located relative to each other such that said platforms have substantially the same path of movement when being moved along said guides, power transmission means between said driving means and said platforms having for each platform an elongated flexible traction element, one end of which is attached to said frame and the other end to the respective platform, said traction element extending in a loop over a pulley, said pulley being operably connected to said driving means and actuated thereby to perform a reciprocating movement, the respective ends of the two traction elements attached to the respective platforms extending in opposite directions along the guides, whereby the platforms are moved in a synchronous displacing movement in opposite directions relative to each other in the path of movement along their respective guides when pulleys are displaced by means of the driving means, and means for pivoting said platforms between said positions whereby one of said platforms will be pivoted to said second position when the other platform is in the first position and moving in the opposite direction to provide free passage in the path of movement for said other platform, said pivoting means comprising a catching means provided to catch a part of said one platform at a distance from the pivoting axis of said one platform to impart a turning movement thereto when said axis is moved along the respective guide together with said one platform.

* * * * *